UNITED STATES PATENT OFFICE.

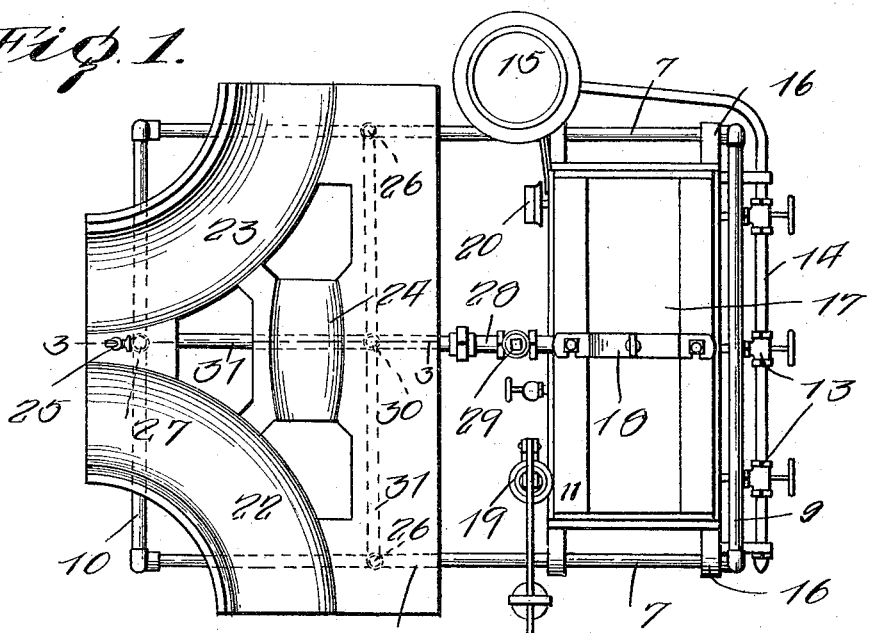
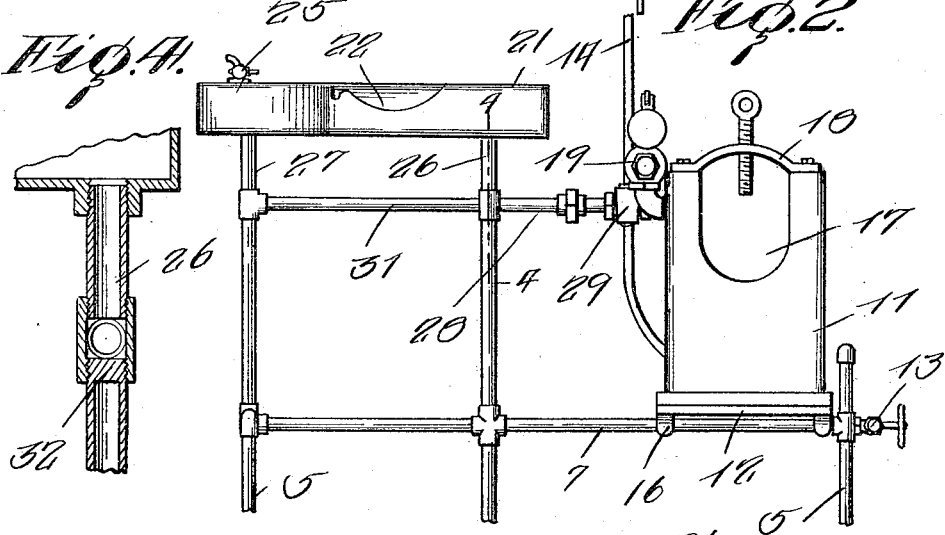

JOHN O. DREW, OF MASON, MICHIGAN.

STEAM-VULCANIZER.

1,125,276. Specification of Letters Patent. Patented Jan. 19, 1915.

Application filed November 12, 1913. Serial No. 800,619.

*To all whom it may concern:*

Be it known that I, JOHN O. DREW, a citizen of the United States, residing at Mason, in the county of Ingham, State of Michigan, have invented certain new and useful Improvements in Steam-Vulcanizers; and I do hereby declare the following to be a full, clear, and exact description of the invention, such as will enable others skilled in the art to which it appertains to make and use the same.

This invention relates to new and useful improvements in vulcanizing apparatus and particularly to such apparatus adapted for use in vulcanizing repair work on pneumatic tires.

The object of the invention resides in the provision of such an apparatus which is efficient in use and easily and readily operated.

A further and more specific object resides in the provision of such an apparatus whereby those pipes which convey the steam to the molds serve also as a portion of the framework of the apparatus which supports the mold.

With these and other objects in view, the invention resides in the novel combination, formation and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a top plan view of the improved vulcanizing apparatus, Fig. 2 is a side elevational view thereof, Fig. 3 is a central vertical sectional view on the line 3—3 of Fig. 1, and Fig. 4 is a detail sectional view on the line 4—4 of Fig. 2.

Referring now more particularly to the accompanying drawings, the supporting structure of the vulcanizer comprises four corner uprights 5 formed of pipe sections. Connected to the upper end of each of the pipe sections by suitable couplings are the side pipe sections 7. Connected to two of the uprights by elbows is an end member 9 disposed above the side members 7 and connected to the other two uprights is an end pipe member 10 lying in the plane of the side member 7. The boiler comprises a tank 11 having secured on its bottom face a boiler plate 12 and carrying adjacent its under face suitable burners 13 which are connected to a pipe 14 extended vertically and carrying a fuel tank 15.

The tank is detachably seated on the support by means of lugs 16 extended outwardly from its bottom portion and having their free portions downwardly bent, said lugs seating on the side members 7. The top portion of the tank is so formed as to provide a mold 17 for receiving a tire casing and a clamping member 18 is secured to the top of the tank to clamp the tire in the mold. Secured to the tank is also a safety valve 19 and a steam gage 20.

For vulcanizing portions of the inner tubes, a hollow member 21 is provided having a flat face. Hollow members 22 and 23 are provided having faces formed to correspond respectively with the sides of a tire casing and adapted to seat the sides for curing such defects as rim cuts. The three members above described are arranged in substantially a triangle and have their interiors mutually communicating. For vulcanizing a small portion of the tread of the tire, the hollow member 24 is provided and disposed within the triangle and having its interior communicating with the interiors of the other members. A faucet valve 25 is provided at the apex of the triangle above described. To provide means for supporting the triangular member and at the same time carrying steam from the tank thereto, pipes 26 extend from the side member 7 to the ends of the hollow member 21 and a pipe 27 extends from the end pipe 10 to the apex of the member. A pipe 28 carrying a shut off valve 29 extends from the tank and is secured to a connection 30 from which extend pipes 31 communicating with the pipes 26 and 27. The pipes 26 and 27 have disposed therein below the pipes 31 suitable plugs 32 so that the steam does not extend down through the supporting frame of the vulcanizer but is directed to the interiors of the members 21, 22, 23 and 24.

The tires and inner casings are clamped to the above members by any suitable means, said members forming as is seen a table.

From the foregoing it is observed that a very simple and efficient structure is provided.

What is claimed is:

1. In a steam vulcanizer, a tank having a mold face, means for heating the tank, hollow mold members mutually connected, and spaced from the tank, a support for said tank and mold members comprising a plurality of suitably arranged pipe sections and certain of said pipe sections also communicating with the interiors of the tank and hollow mold members to introduce steam into said members.

2. In a steam vulcanizer, a rectangular frame formed with a plurality of pipe sections, a tank carried by said frame, a plurality of mutually connected hollow mold members spaced from the tank, vertical pipe sections extending from the frame to support the hollow mold members and communicating with the interior thereof, and pipes leading from said vertical pipes to the tank.

3. In a steam vulcanizer, a rectangular supporting frame, a boiler comprising a tank carried by said frame and having a mold in its upper portion, a hollow mold member for inner tubes, hollow mold members for seating the sides of a tire casing, said members arranged to form a triangle and having their interiors mutually communicating, a tread mold member disposed within the triangle and having its interior communicating with the interiors of the other members vertical pipes extending from the frame to the hollow members, pipes leading from said vertical pipes and communicating with the boiler and plugs in the vertical pipes below said last-mentioned pipes.

In testimony whereof, I affix my signature, in the presence of two witnesses.

JOHN O. DREW.

Witnesses:
N. N. ROUSE,
G. L. PECK.

Copies of this patent may be obtained for five cents each, by addressing the "Commissioner of Patents, Washington, D. C."